United States Patent [19]

Smith

[11] Patent Number: 4,872,953
[45] Date of Patent: * Oct. 10, 1989

[54] APPARATUS FOR IMPROVING THE QUALITY OF PAPER MANUFACTURED FROM RECYCLED PAPER WITH A HYDROKINETIC AMPLIFIER

[75] Inventor: William E. Smith, Greenville, S.C.

[73] Assignee: EZE Products, Inc., Greenville, S.C.

[*] Notice: The portion of the term of this patent subsequent to Feb. 23, 2005 has been disclaimed.

[21] Appl. No.: 157,052

[22] Filed: Feb. 16, 1988

Related U.S. Application Data

[63] Continuation-in-part of Ser. No. 943,615, Dec. 18, 1986, Pat. No. 4,726,880.

[51] Int. Cl.⁴ ............................................. D21C 5/02
[52] U.S. Cl. ................................. 162/261; 162/4; 162/55; 162/63; 209/250; 241/79.1; 137/896
[58] Field of Search ............... 162/4, 232, 5, 55, 63, 162/68, 261; 209/250, 3, 17; 241/24, 28, 79.1; 366/150, 163, 165; 137/889, 896

[56] References Cited

U.S. PATENT DOCUMENTS

| | | | |
|---|---|---|---|
| 2,697,661 | 12/1954 | Hollis | 162/4 |
| 3,741,863 | 6/1973 | Brooks | 162/4 |
| 4,030,969 | 6/1977 | Asplund et al. | 162/68 |
| 4,312,701 | 1/1982 | Campbell | 162/4 |
| 4,332,638 | 6/1982 | Mauer et al. | 162/5 |
| 4,515,655 | 5/1985 | Schaefer | 162/57 |
| 4,569,635 | 2/1986 | Nicodemus | 417/196 |
| 4,726,880 | 2/1988 | Smith | 162/4 |

OTHER PUBLICATIONS

Tappi, Feb. 1978 pp. 31-34 t"Ultrasonic deinking of waste paper".

*Primary Examiner*—Karen Hastings
*Attorney, Agent, or Firm*—Dority & Manning

[57] ABSTRACT

An apparatus and method for improving the quality of paper manufactured from recycle paper stock which comprises a hydrokinetic amplifier, a pulper, a dump chest, a cyclone separator, a pressure screen, a vibratory screen and a holding tank. Contaminants contained in the fibrous stock are dispersed and emulsified during the process to produce a better quality fiber stock. The hydrokinetic amplifier generates pressure at its exit while dispersing the contaminants in the fiber stock. The energy possessed in the stock can be utilized to feed the stock through additional treatment devices such as ultrasonic generators and a device for causing the stock to take a tortuous path as it is passed therethrough to further break down the contaminants.

6 Claims, 4 Drawing Sheets

APPARATUS FOR IMPROVING THE QUALITY OF PAPER MANUFACTURED FROM RECYCLED PAPER WITH A HYDROKINETIC AMPLIFIER

This is a continuation-in-part application of application entitled "Method And Apparatus For Improving The Quality Of Paper Manufactured From Recycled Paper", Ser. No. 06/943,615 filed on Dec. 18, 1986 now U.S. Pat. No. 4,726,880.

BACKGROUND OF THE INVENTION

The present invention relates to methods and apparatus for manufacturing paper, and in particular, paper manufactured which uses a substantial portion of recycled stock such as old corrugated container (OCC) fiber, de-inking grades and mixed paper.

It is desirable to increase the percentage of recycled fiber, such as OCC fiber, that is used in the manufacture of paper such as linerboard and other kinds of paper such as tissue paper. However, increasing the percentage of OCC fiber for example, causes the appearance of waxy specs in the linerboard, and such waxy specs render the linerboard quality unacceptable in certain container applications. The waxy specs causing this visual quality problem in the final linerboard product comprise melted or fused paraffin wax, polyethylenes, hot melt, polypropylene film, polyethylene film, foam plastic such as styrofoam and urethane foam, latex glue residue, fused polystyrene, etc. Most of these constituents are organic materials, which can be synthetic or naturally occurring, that are solids at room temperature, but which flow at higher temperatures. Because of this transition to soft highly pliable solids or high viscosity liquids at temperatures in the 120° F. to 180° F. range, it is difficult to screen out those constituents. Moreover, since the bulk specific gravity of these constituents are frequently in the same range as process water, i.e., 0.95 to 1.00, they are difficult to separate by centrifugal means.

In an attempt to improve the quality of the final paper product, paper mills which recycle OCC fiber have used systems known as asphalt dispersion systems in preparing the stock. A typical paper mill using OCC fiber begins the process by dumping OCC into a pulper and adding water until the mixture is a consistency of about 4% solids by weight. The pulper has rotating mechanical elements which break down the solids into a slurry consisting of paper pulp and contaminants. Typically, the contaminants include bulk contaminants such as larger pieces of metal and glass, nails, staples, beverage cans and bottles. There are also smaller particulate contaminants consisting of inorganic matter such as sand and various organic materials such as waxes, polyethylene films, polypropylene, glue, styrofoam, etc. Many of the smaller particulate contaminants are sticky substances which will tend to attach to one another and agglomerate into larger particles of sticky substances. The stream of paper stock leaving the pulper with a 4% consistency typically was directed to a holding tank for purposes of providing some means of controlling the flow of stock through the mill. The 4% consistency contaminated stock then is passed through a rough screen which filters out bulk contaminants such as glass bottles, cans, chunks of metal and other coarse debris. Then the contaminated stock is passed through two kinds of thickeners which produce a stock stream of approximately 30% consistency by weight. An extractor screw is one kind of thickener which removes water from the stock stream as it is moved through the length of a vessel containing a slowly rotating screw. A second kind of thickener is a press, which squeezes additional water from the stock stream. The water which is removed by the thickeners to go from a 4% consistency contaminated stock stream to a 30% consistency contaminated stock stream is typically pumped back to the pulper. The 30% consistency contaminated stock stream next is fed into a digester, which is a massive pressure vessel surrounding a large metal screw which slowly rotates at around 100 rpm and carries the stock stream forward through the digester. The digester also receives steam which heats the contaminated stock to around 300° F. and pressurizes it as it moves through the digester. The digester sometimes is referred to as a "steaming tube". Upon exiting the digester, the contaminants have been dispersed throughout the pulp by the heating action of the steam and the pressurizing action of the steam and the screw. This dispersed contaminant stock stream is converted from 30% consistency to 4% consistency by pumping water into it. Then the 4% consistency dispersed contaminant stock stream is passed through a refiner, which is a massive pressure vessel having two rotating interfacing plates that act as a mill. Typically, the plates of the refiner rotate at approximately 1600 rpm. The stock is fed to the center of the two rotating elements, which have radially extending ribs on their interfacing surfaces, and the relative movement between the rotating plates mechanically works the 4% consistency dispersed contaminant stock stream and moves it from the center of the plates to the periphery of the plates and out of the refiner to another holding tank. The dispersed contaminant stock in this holding tank is ready for processing into paper, as by a fourdrinier machine. Typically, this stock is used to feed the secondary head box of a fourdrinier machine or the liner vats of a combination paperboard machine.

Thus, an asphalt dispersion system treats the entire stream of the accept feed which goes to the paper making machine. Such full steam treatment by the asphalt dispersion system causes hemicellulose extraction from the entire stream. This is because the asphalt dispersion systems are characterized by high heat over a long period of time. Such hemicellulose extraction reduces fiber strength and bonding and thereby reduces paper board strength.

In addition to having the disadvantage of weakening the strength of the final paper product, the asphalt dispersion system also has the disadvantage of being very costly to implement and operate. The thickeners and the digester are very expensive pieces of equipment. They all must be large enough and sturdy enough to accept the entire stream of contaminated stock to be used by the paper mill and to subject it to pressures of the stream and moving parts therein. Moreover, heavy duty water pumps and chests are required at different sites to handle the consistency changes of the stream as required by the asphalt dispersion treatment. A typical asphalt dispersion system costs in the neighborhood of $300,000 to $500,000, depending upon the sophistication of the thickeners. While the less sophisticated thickeners tend to keep the cost in the $300,000 end of the range, they also require significantly more maintenance. The operating cost for a typical asphalt dispersion system is approximately $13 per ton of pulp. A significant amount of steam is required to treat the entire stream of stock, and the cost of providing this steam is significant.

The cost of maintaining the thickeners also is significant, especially in the case of the older and less sophisticated thickener equipment which still is used by many producers of recycled stock.

These costs have prompted some paper mills to eliminate the asphalt dispersion system in favor of a plurality of screening mechanisms which pass the contaminated stock stream through a series of screens. The later screens have smaller openings than the earlier screens, and the later screens also have openings of a different shape such as slotted versus circular. After this screening, the stock stream is passed through a refiner. Since the screens are less costly than the thickeners and digester, and since the need for steam has been eliminated, this alternative system is a less costly alternative to the asphalt dispersion system. Whatever small particulate impurities remain after screening are dispersed in the refiner, but the visual quality of the final product is not as acceptable as the visual quality of the final product from the pulp processed through the asphalt dispersion system.

Chemical treatment of the entire stock stream has been used in conjunction with both the asphalt dispersion system and the screening system. The chemicals added to the stock stream typically are combinations of organic dispersants, wetting agents and inorganic materials such as talc. These chemicals promote dispersion of the organic contaminants and break up particles of such contaminants and hold them in suspension so that they do not agglomerate and form noticeable blotches in the final paper product. Such blotches render the quality of the final product unacceptable to the degree that the blotches are prevalent. The amount of chemicals needed to treat the entire stock stream constitutes a significant operating expense.

OBJECTS AND SUMMARY OF THE INVENTION

It is a principal object of the present invention to provide a method and apparatus for improving the quality of recycled pulp which is produced from secondary fiber.

It also is an object of the present invention to provide a method and apparatus for enabling the percentage of secondary fiber to be increased in the manufacture of paper such as linerboard or tissue.

It is a further object of the present invention to provide a method and apparatus for dispersing and emulsifying contaminants associated with secondary fiber used in the production of paper so as to eliminate visual quality problems associated with such constituents in the final paper product.

Another object of the present invention is to provide a method and apparatus for enabling the percentage of secondary fiber to be increased in the manufacture of linerboard without requiring full stream treatment.

Yet another object of the present invention is to provide a method and apparatus for enabling the use of an increased percentage of secondary fiber in the manufacture of linerboard that does not require the application of high heat over an extended period of time.

A further object of the present invention is to enable the use of an increased percentage of secondary fiber in the production of linerboard without reducing paperboard strength.

Still another object of the present invention is to provide a method and apparatus for increasing the percentage of secondary fiber in the production of linerboard that does not result in reduced fiber strength and bonding.

A further object of the present invention is to provide a method and apparatus of enabling use of an increased percentage of secondary fiber in the production of linerboard that does not result in extraction of hemicellulose.

Yet another object of the present invention is to provide a method and apparatus for increasing the percentage of secondary fiber used in the production of linerboard that does not result in increased rejects that must be disposed of as by land filling.

Still another object of the present invention is to provide a method and apparatus for increasing the percentage of secondary fiber used in the production of linerboard that reduces cleaning and maintenance required to sustain paper machine productivity.

Still another important object of the invention is to utilize the discharge pressure of the stock exiting from a hydrokinetic amplifier to force said stock through a further treatment device.

A further object of the invention is to provide a device that can be connected to the output of an apparatus for emulsifying and dispersing contaminants associated with secondary fiber stock for further treatment of said fiber stock while providing back pressure on said apparatus.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The objects of the present invention are accomplished by an apparatus for improving the quality of paper manufactured from a contaminated fibrous stock having therein secondary fiber and contaminants smaller than a predetermined size and with a specific gravity approximating the specific gravity of whitewater used in the production of recycled paper stock. The apparatus of the present invention preferably comprises a hydrokinetic amplifier means having a mixing chamber connected to each of the steam inlet, a stock inlet, a chemical feed inlet, an overflow discharge, and a venturi. The stock inlet receives the contaminated fibrous stock and supplies it to the mixing chamber. The steam inlet allows steam to enter the mixing chamber so that the steam mixes with the stock in the mixing chamber and transfers the steam's energy to the contaminated fibrous stock as the steam condenses. This increases the pressure and temperature of the contaminated fibrous stock from the temperature and pressure of the stock at the stock inlet. The venturi is located downstream from the mixing chamber and between the mixing chamber and the outlet of the amplifier means. The venturi increases the pressure of the contaminated fibrous stock that passes through the venturi. Emulsifying chemicals are provided to the mixing chamber through the chemical feed inlet and mix with the contaminated fibrous stock and steam so that any dispersed contaminants in the contaminated fibrous stock become emulsified. The contaminants in the fibrous stock are subjected to heat and cavitational forces in the venturi with the result that the contaminants are dispersed and ready to receive the action of the emulsifying chemicals. Once the mixture has reached the outlet, the contaminated fibrous stock has dispersed contaminants which have been emulsified, and the stock is at a pressure and temperature that is substantially greater than the pressure and temperature of the contaminated fibrous stock received at the stock inlet.

The apparatus of the present invention preferably further comprises means for conveying the heated contaminated stock having dispersed and emulsified contaminants therein from the outlet of the amplifier means to a means for receiving hot water and secondary fiber and converting them into contaminated fibrous stock.

A pulper preferably comprises the means for receiving hot water and secondary fiber and converting them into contaminated fibrous stock. The term "recycled paper products" is used interchangeably herein with the term "secondary fiber". The contaminated fibrous stock is a slurry containing fibrous stock and contaminants.

The apparatus of the present invention further comprises means for separating the slurry into an accept fibrous stock suitable for use in making paper products and a reject fibrous stock containing contaminants. The slurry separation means preferably comprises means for removing heavier-than-water contaminants from the contaminated fibrous stock and means for separating the fibrous stock into an accept fibrous stock and a reject fibrous stock.

The apparatus of the present invention further comprises means for removing heavier-than-water contaminants from the contaminated fibrous stock. The heavier-than-water contaminant removal means preferably comprises a cyclone separator unit which removes such contaminants as bottles, cans, chunks of metal and other debris.

The apparatus of the present invention further includes means for separating the fibrous stock into an accept fibrous stock and a reject fibrous stock. The stock separation means preferably comprises a pressure screen which receives the filtered flow of contaminated stock from the cyclone separator. The pressure screen divides this flow into an accept fibrous stock and a reject fibrous stock. The accept fibrous stock is freed of particulate matter that is generally larger than a first predetermined size by having passed through a screen under pressure. Where larger capacity is desired, a plurality of screens can be employed. The reject fibrous stock comprises the material which was unable to pass through the screen under pressure, and therefore includes substantially all of the larger-than-a-first-predetermined-size particulate matter that was removed from the accept fibrous stock by the pressure screen.

The apparatus of the present invention further includes size-determinant particle removal means. The size-determinant particle removal means preferably comprises a vibratory screen which removes particulate matter larger than a predetermined size from the reject fibrous stock coming from the reject stream of the pressure screen. The particles removed by the vibratory screen constitute refuse, and the contaminated accept stock comprises fibrous stock and particulate matter smaller than a predetermined size. The refuse comprises fibrous and particulate matter larger than the predetermined size.

The apparatus of the present invention further comprises means for controlling the flow of contaminated accept stock. The flow control means preferably comprises a pump and a holding tank. The holding tank preferably is connected to the vibratory screen for receiving the contaminated accept stock. The pump pumps contaminated accept stock from the holding tank and supplies contaminated accept stock to the hydrokinetic amplifier means in a controlled and regulated manner.

The apparatus of the present invention further includes means for selectively diverting contaminated accept stock of the size-determinant particle removal means from the amplifier means to the conveying means. The selectively diverting means preferably comprises a valve situated in the pipe connecting the vibratory screen to the holding tank for supplying the contaminated accept stock from the output of the vibratory screen to the holding tank. The selectively diverting means further includes a pipe connected at one end to this valve and at the other end to a second valve which also has pipe connections leading to each of the pulper and the amplifier means. Thus, the two valves can be operated to short circuit the flow of accept stock from the vibratory screen to the pulper rather than to the holding tank.

The objects of the invention also are accomplished in a recycled paper stock manufacturing process employing a pulper. The method of the present invention is for improving the quality of paper manufactured from contaminated fibrous stock that comprises secondary fiber and contaminants smaller than a predetermined size and having a specific gravity substantially equal to the specific gravity of paper stock manufacturing whitewater. The method of the present invention comprises the steps of mixing steam with contaminated fibrous stock in a mixing chamber to raise the pressure and temperature of the contaminated fibrous stock. This preferably is accomplished by providing steam and contaminated fibrous stock to the mixing chamber of a hydrokinetic amplifier.

The method further comprises mixing the contaminated fibrous stock with chemicals which promote emulsification of dispersed contaminants in the stock. This is preferably accomplished by providing emulsifying chemicals and contaminated fibrous stock to the mixing chamber of a hydrokinetic amplifier.

The method further comprises flowing the mixture of contaminated fibrous stock, steam and emulsifying chemicals through a venturi to apply cavitational forces to contaminants in the contaminated fibrous stock to disperse the contaminants and produce contaminated accept stock having contaminants dispersed and emulsified therein. The pressure and temperature of the contaminated accept stock is also increased from the pressure and temperature of the contaminated fibrous stock in the mixing chamber. This step preferably is accomplished in the venturi section of a hydrokinetic amplifier.

The method of the present invention further comprises the step of returning to the pulper the heated contaminated accept stock with dispersed and emulsified contaminants therein. This preferably is accomplished by piping the heated contaminated accept stock from the outlet of a hydrokinetic amplifier to the pulper.

The method of the present invention further comprises combining hot water and secondary fiber in a pulper and converting this combination into contaminated fibrous stock. This step preferably is accomplished by a pulper which receives hot water and secondary fiber and breaks it down and mixes it to yield a contaminated fibrous stock.

The method also includes the step of removing from the contaminated fibrous stock substantially all of the bulk contaminants heavier-than-water. This step is accomplished by flowing the contaminated fibrous stock from the pulper through a cyclone separator which removes bulk contaminants like bottles, glass and chunks of metal.

The method of the present invention further comprises separating the contaminated fibrous stock into an accept stock and a reject stock. This step preferably is accomplished by flowing the contaminated stock from the cyclone separator to a pressure screen which removes particulate matter larger than a first predetermined size to yield an accept stock. The pressure screen also provides a reject stock which includes substantially all of the matter removed from the accept stock.

The method of the present invention further includes the step of removing from the reject stock the particulate matter larger than a second predetermined size. This step is preferably accomplished by a vibratory screen which receives the reject stock from the pressure screen and filters out all particulate matter that is larger than a second predetermined size to form an accept stock. The contaminated accept stock includes fibrous stock and particulate matter smaller than the second predetermined size.

The method of the present invention includes the further step of providing a predetermined flow of the contaminated accept stock coming from the vibratory screen. This is accomplished by providing a holding tank to receive the contaminated accept stock and providing a pump that pumps a controlled amount of contaminated accept stock from the holding tank as required. The pump then provides the predetermined flow of contaminated accept stock to the hydrokinetic amplifier means.

The accompanying drawings, which are incorporated in and constitute a part of this specification, illustrate exemplary embodiments of the invention, including the preferred embodiment, and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

In accordance with the present invention, an apparatus is provided for improving the quality of paper manufactured from a contaminated fibrous stock having therein secondary fiber and contaminants smaller than a predetermined size and with a specific gravity approximately equal to the specific gravity of whitewater used in the production of recycled paper stock. The apparatus of the present invention comprises a hydrokinetic amplifier means for mixing contaminated fibrous stock with steam and emulsifying chemicals and for subjecting the contaminants of the fibrous stock to heat and cavitational forces to produce dispersed contaminants and for increasing the pressure and temperature of the fibrous stock. As embodied herein and shown, for example, in FIGS. 1 and 2, the hydrokinetic amplifier means preferably comprises a hydrokinetic amplifier which is indicated generally in FIG. 1 by the numeral 12. Hydrokinetic amplifier 12 is an embodiment of the type disclosed in U.S. Pat. No. 4,569,635 to Nicodemus, which is hereby incorporated herein by reference, that is known by the trade name Heliojet and is available from the assignee of the present patent application. Hydrokinetic amplifier 12 has a housing 13, a mixing chamber 14 to which is connected a steam inlet 16, a stock inlet 18, a chemical feed inlet 20 and an overflow discharge 22. Housing 13 has an interior wall 15, and mixing chamber 14 is contained in the interior of housing 13. A venturi 24 (shown in phantom in FIG. 2) has an inlet 17 which communicates with mixing chamber 14 and has an outlet 25 which is connected to an outlet 26 of hydrokinetic amplifier 12. Stock inlet 18 is connected to a jet 28. Stock inlet 18 and jet 28 comprise the means for feeding a reject fibrous stock and contaminants through housing 13 in the form of a liquid column which is substantially out of contact with interior wall 15 of housing 13. Steam inlet 16 comprises the means for supplying steam to the interior of housing 13 for engaging the column of reject stock flowing through housing 13.

Hydrokinetic amplifier 12 has an outlet 26 which communicates with the end of venturi 24 that is opposite the end of venturi 24 communicating with mixing chamber 14. Preferably, outlet 26 is connected to a right angle pipe fitting such as a cross fitting 19 shown in FIG. 2. The flow of contaminated fibrous stock exiting outlet 26 of hydrokinetic amplifier 12 makes a right angle turn inside cross fitting 19, which is connected to leader pipe 21. A stainless steel plug 23 is provided to seal the exit of cross fitting 19 that is opposite the exit of cross fitting 19 connected to outlet 26 of hydrokinetic amplifier 12. The flow leaving hydrokinetic amplifier 12 via outlet 26 impinges upon the interior of plug 23 and causes severe wear of plug 23, which is replaceable as needed. Upon subjecting the flow exiting outlet 26 to a right angle turn, cross fitting 19 thereby facilitates complete mixing and heat transfer of fluid which leaves hydrokinetic amplifier outlet 26.

In accordance with an alternative embodiment of the present invention, a treatment means is provided for converting reject fibrous stock containing contaminants into a mixture of fibrous stock with dispersed contaminants of a reduced size. The treatment means includes a housing having an interior wall, an outlet, and an inlet for receiving reject fibrous stock and contaminants. The treatment means further includes means for feeding the reject fibrous stock and contaminants through the housing in the form of a liquid column which is substantially out of contact with the interior wall. The treatment means further includes means for supplying steam to the interior of the housing for engaging the column of reject stock flowing through the housing. As embodied herein and shown in FIGS. 1 and 2 for example, the treatment means preferably comprises hydrokinetic amplifier 12.

Figure 1:
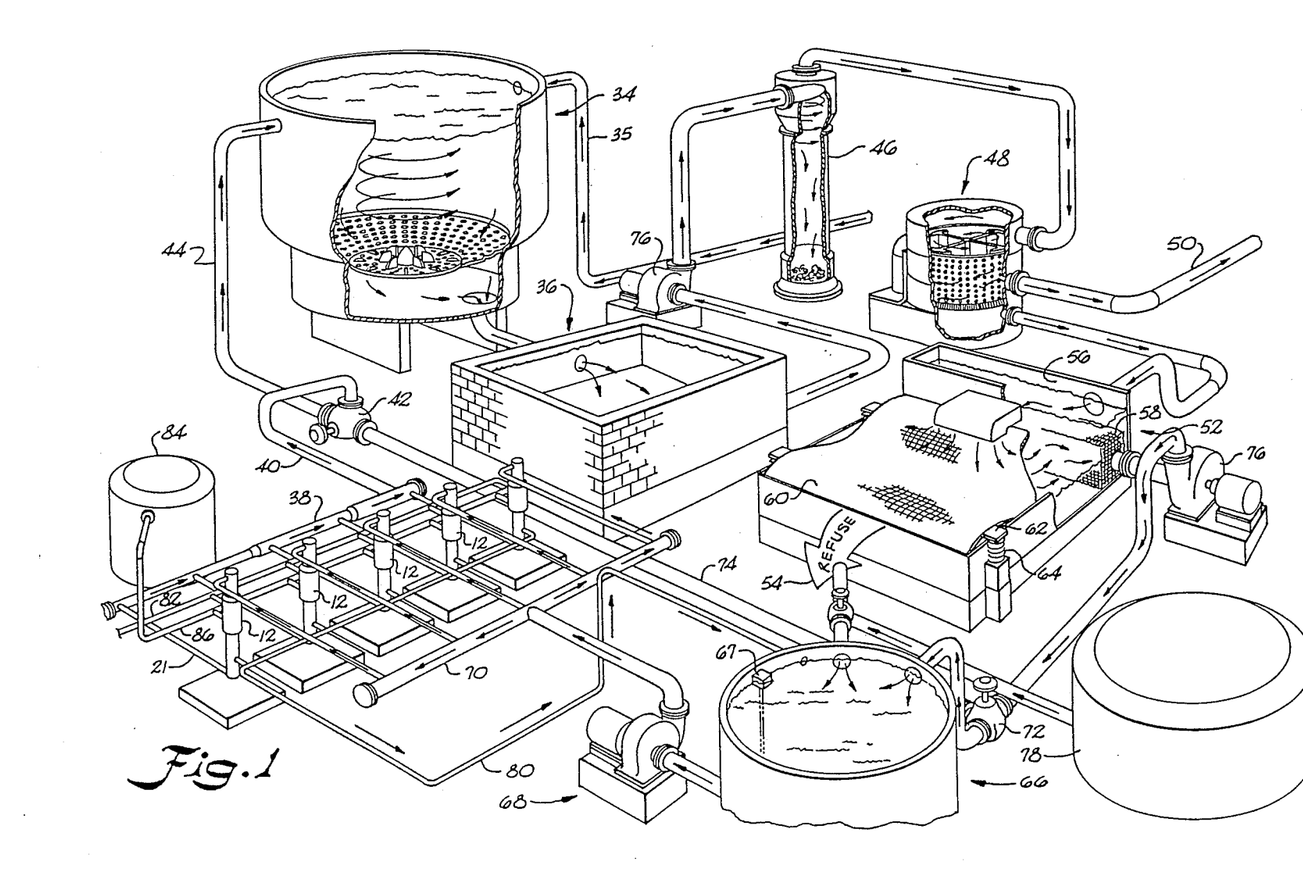
FIG. 1 is a schematic plan view of an embodiment of the present invention.
Figure 2:
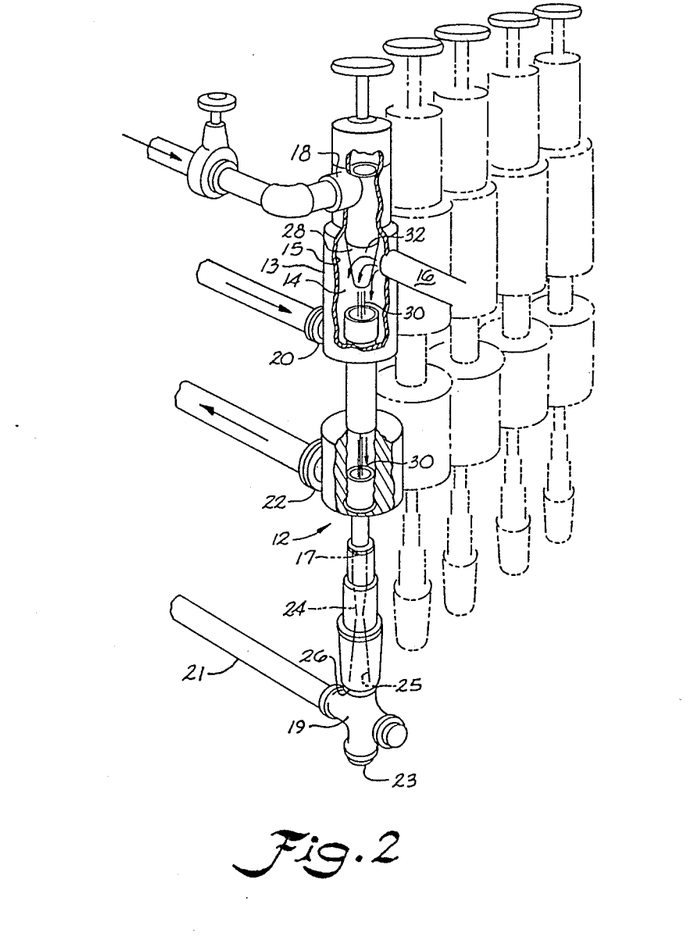
FIG. 2 is a schematic plan view of some of the components of the embodiment of the invention shown in FIG. 1.

In operation, contaminated fibrous stock is received through stock inlet 18 and flows through jet 28 to produce a stream 30 which flows through the center portion of mixing chamber 14. Stock stream 30 flows away from the walls of mixing chamber 14. Stream 30 comprises a liquid column of fibrous stock and contaminants that flows substantially out of contact with the interior wall of housing 13. Steam is indicated by the arrows designated 32 which emanate from steam inlet 16 to indicate that steam is provided to mixing chamber 14 via steam inlet 16. The steam mixes with stock stream 30 to condense and transfer energy from the steam to the stock. Such heats the stock and raises the pressure of the stock from the temperature and pressure of the stock entering mixing chamber 14. Emulsifying chemicals enter through chemical feed inlet 20, and their effect on the contaminants in the fibrous stock is enhanced by the heat provided by the steam. As the mixture of emulsifying chemicals, steam and contaminated stock flows under the influence of fluid pressure and gravity through venturi 24, cavitational forces and heat are applied to the contaminants and fiber flakes in the stock. The combined action of the heat and cavitational forces disperses the contaminants, and the emulsifying chemicals act on the dispersed contaminants to emulsify the contaminants and prevent them from agglomerating or adhering to anything other than the emulsifying chemicals. The cavitational forces also break up wet strength flakes that may be present in the contaminated fibrous stock. Substantially all of the steam is condensed when the mixture leaves venturi 24. The pressure and temperature of the stock at outlet 26 is substantially greater than the pressure and temperature of the stock received by stock inlet 16.

Overflow discharge 22 is used during start-up operation of hydrokinetic amplifier 12 until the proper mix of emulsifying chemical flow and stock flow is obtained for the steam flow and pressure. Typically, a hydrokinetic amplifier which receives a stock flow of gallons per minute requires a chemical flow of proximately 0.02 to 0.04 gallons per minute and a steam flow of approximately 4,000 pounds per hour of saturated steam. Any emulsifying chemical formulation is suitable for use in this system. One suitable formulation of emulsifying chemical preferably includes the following constituents in the indicated proportions by weight;

30% Water
10% Dipropylene Glycol Monomethyl Ether
5% Sesquioleate
5% Sodium Salt of Tall Oil Fatty Acid
4% Ethoxylated Alcohol
8% Ethoxylated Nonyl Phenol such as Triton N-101 from Rohm & Haas
3% Pentasodium Diethylene Triamine Pentaacetate
35% Odorless Mineral Spirits Depending on the needs of the user, these constituents can be varied over the following range of proportions by weight:

78-30% Water
2-10% Dipropylene Glycol Monomethyl Ether
2-5% Sesquioleate
2-5% Sodium Salt of Tall Oil Fatty Acid
2-4% Ethoxylated Alcohol
2-8% Ethoxylated Nonly Phenol
2-3% Pentasodium Diethylene Triamine Pentaacetate
10-35% Odorless Mineral Spirits In further accordance with the present invention, there is provided means for receiving hot water and secondary fiber and converting them into contaminated fibrous stock. As embodied herein and shown, for example, in FIG. 1, the means for receiving hot water and secondary fiber and converting them into contaminated fibrous stock includes a pulper indicated generally by the numeral 34. Pulper 34 receives whitewater, which is processed water, from a pipe source 35. Secondary fiber is also supplied to pulper 34, which has rotating blades to break down the secondary fiber which has been softened by the water. Hot water preferably is supplied to pulper 34 exclusively via a return pipe 44 which will be explained more fully hereafter. A dump chest 36 can be provided to receive the contaminated fibrous stock leaving pulper 34 and provide a storage facility for this contaminated fibrous stock.

In further accordance with the present invention, there is provided means for conveying heated contaminated stock having dispersed and emulsified contaminants therein from the outlet of the hydrokinetic amplifier means to the pulper. As embodied herein and shown, for example, in FIG. 1, the means for conveying any contaminated stock having dispersed and emulsified contaminants therein from the outlet of the hydrokinetic amplifier means to the pulper comprises a piping arrangement which includes a manifold 38, an off-take pipe 40, a switching valve 42 and a return pipe 44. Manifold 38 is connected to each outlet 26 of each hydrokinetic amplifier 12 to receive from each hydrokinetic amplifier the heated contaminated stock having dispersed and emulsified contaminants. Manifold 38 empties into off-take pipe 40 which carries the heated contaminated stock having dispersed and emulsified contaminants to switching valve 42. Return pipe 44 is connected at one end to switching valve 42 and empties at the other end into pulper 34. The pressure of the contaminated stock leaving outlet 26 of each hydrokinetic amplifier 12 is sufficient to move this stock through manifold 38, off-take pipe 40, switching valve 42 and return pipe 44 without any mechanical pumping apparatus. In addition, a pressure valve can be provided on the end of return pipe 44 which empties into pulper 34 to create a controlled back pressure which allows the hydrokinetic device to operate in a balanced condition, creating cavitation within the stock stream.

The provision of the hot water from outlet 26 of each hydrokinetic amplifier 12 to pulper 34 is highly desirable to facilitate breakdown of the secondary fiber into the contaminated fibrous stock by pulper 34. In addition, the pressure of the contaminated stock leaving outlet 26 of each hydrokinetic amplifier 12 eliminates the need to provide a mechanical pumping apparatus to convey the stock to pulper 34.

In further accordance with the present invention, there is provided means for removing heavier-than-water contaminants from contaminated fibrous stock. As embodied herein and shown, for example, in FIG. 1, the means for removing heavier-than-water contaminants from contaminated fibrous stock comprises a cyclone separator 46 which can be connected to pressure screen 48, depending upon the desired arrangement. Cyclone separator 46 uses centrifugal force to separate contaminants which are heavier-than-water. This is a bulk separation unit which also separates large objects from the contaminated fibrous stock. Examples of the kinds of contaminants separated by cyclone separator 46 include glass bottles, cans, chunks of metal, rocks and sand. The bulk contaminants removed by the cyclone separator 46 fall to the bottom of cyclone separator 46 and are collected there until removed. Cyclone separator 46 is an example of a specific gravity determinant removal means, because it removes contaminants that have a larger specific gravity than the water which comprises the contaminated fibrous stock.

In further accordance with the present invention, there is provided means for separating contaminated fibrous stock into an accept fibrous stock and a reject fibrous stock. As embodied herein and shown, for example in FIG. 1, a means for separating fibrous stock into an accept fibrous stock and a reject fibrous stock comprises a pressure screen 48 which receives contaminated fibrous stock from cyclone separator 46 and passes this stock through a screen which has an opening size that has been predetermined according to the requirements of the system. The flow of contaminated fibrous stock which passes through the pressure screen becomes the accept fibrous stock, and the flow which fails to pass through the pressure screen becomes the reject fibrous stock. The accept fibrous stock is substantially free of particulate matter heavier than water and larger than the predetermined size of the pressure screen openings. As the contaminated fibrous stock moves through pressure screen 48, particulate matter flows to the lower portion of pressure screen 48 and is collected there for removal with the reject fibrous stock stream. The accept stock from pressure screen 48 is provided to the papermaking machinery (not shown) by a paper process pipe 50. The accept stock can be passed through more refined screens or a refiner before it is provided to the papermaking machinery.

Pressure screen 48 is primarily a size determinant contaminant removal means. This is because it removes contaminants based upon the size of the contaminants. Pressure screen 48 also is a stock separation means because it separates an incoming stream of stock into at least two output streams of stock, each output stream having different characteristics depending upon the contaminants removed by the pressure screen.

A secondary pulper such as a turbo separator (not shown) could be used in place of pressure screen 48. Briefly, a turbo separator is a device that is capable of removing both heavy and light contaminants. A secondary pulper separates contaminants from the stock stream by the operation of centrifugal force. A turbo separator is somewhat less efficient than a pressure screen in removing contaminants, but is somewhat more efficient in defibering the stock. Typically, stock is injected into a secondary pulper tangent to the separator body and receives rotational speed by a rotor. As the stock moves along the wall of the separator under the influence of the rotor, heavy and light particles are separated from the stock stream by a vortex action. Heavyweight contaminants are collected in a reject trap and leave the secondary pulper. The heavyweights leaving the secondary pulper are passed through a cyclone to be pulled from the system. A purge line is also provided to remove lightweight contaminants from the central vortex.

In further accordance with the present invention, there is provided size-determinant particle removal means for removing particulate matter larger than a predetermined size from a reject fibrous stock stream. As embodied herein and shown, for example, in FIG. 1, the size-determinant particle removal means preferably comprises a vibratory screen 52 which is connected to pressure screen 48 to receive the reject fibrous stock from pressure screen 48. Vibratory screen 52 can be connected to cyclone separator 46 or dump chest 36 of pulper 34 as desired according to the arrangement of the system.

Vibratory screen 52 includes an inlet box 56, which receives the entering stock. The stock then overflows across a weir 58 onto a screen plate 60 which is equipped with holes or slots generally ranging in diameter or width, respectively, from 2 to 6 mm. Screen plate 60 is supported by a cradle 62 which is attached to springs 64. A motor (not shown) and cam shaft arrangement (not shown) is also attached to cradle 62 so that the speed of the motor determines the frequency of vibration of screen plate 60. The amount of cam offset determines the distance over which screen plate 60 vibrates. As screen plate 60 moves upward against the direction of the flow of contaminated stock, the accepted stock passes through screen plate 60 into a chamber below and leaves vibratory screen 52 by gravity. Due to the undulating forward motion of screen plate 60, the rejected materials travel along the surface of screen plate 60 and fall into a dumpster. Typically, a low volume shower (not shown) of 5 to 15 gallons per minute at the refuse end of screen plate 60 helps separate fibers that are trapped with contaminants to allow the fibers to be accepted and keep fiber loss to a minimum.

The opening size of the screen plate of vibratory screen 52 typically is in the range of 73 thousandths to 93 thousandths of an inch. The size of the openings of vibratory screen 52 can be varied depending upon the requirements of the system. The opening size of the screen plate must be sufficiently large to keep the fiber loss to a minimum. Typically, the efficiency of a vibratory screen varies from 20 to 40% in the removal of contaminants. The contaminants are actually removed from the system by the vibratory screen as refuse, which is indicated by the broad arrow designated 54 in FIG. 1. Thus, the accept stock coming from vibratory screen 52 contains a significant amount of contaminants, and these contaminants are smaller than the opening size of the screen plate of vibratory screen 52. As the size of the screen plate openings is increased, the tonnage capacity that can be handled by vibratory screen 52 also increases, but there is a commensurate drop in the efficiency of contaminant removal.

In further accordance with the present invention, there is provided means for controlling the flow of contaminated accept stock. As embodied herein and shown, for example in FIG. 1, the means for selectively diverting contaminated accept stock comprises switching valve 42, a second switching valve 72 and a diversion pipe 74. Contaminated fibrous stock is provided through second switching valve 72 from the accept stream coming from vibratory screen 52. One end of diversion pipe 74 is connected to second switching valve 72 so that second switching valve 72 can be operated to direct the contaminated accept stock either to holding tank 66, and eventually through hydrokinetic amplifiers 12, or to diversion pipe 74. The other end of diversion pipe 74 is connected to switching valve 42 which can be operated to connect diversion pipe 74 to return pipe 44 and pulper 34. Thus, by the operation of the two switching valves 42, 72, the flow of contaminated accept stock from vibratory screen 52 can be returned to pulper 34 instead of being processed by hydrokinetic amplifiers 12. The selective diversion means of the present invention permits isolation of the hydrokinetic amplifiers when it is desired not to operate them. This might occur during servicing of pump 68 or the hydrokinetic amplifiers, or when it is desired not to operate the hydrokinetic amplifier portion of the recycled stock cleaning system.

Though not shown in FIG. 1, the fibrous contaminated stock from pulper 34 can be provided to the stock inlet of one or more hydrokinetic amplifiers directly. Similarly, the output stream of stock from any of the various components can be supplied directly to one or more hydrokinetic amplifiers, as desired. However, the system operates most efficiently in the arrangement shown in FIG. 1 for those applications in which it is desired to increase the marginal quality of the paper produced from the secondary fiber going into the pulper. While the cleansing effect of the hydrokinetic amplifier portion of the system would be most pronounced if this portion of the system was connected to receive the accept fibrous stock from pressure screen 48 via paper process pipe 50, this arrangement would be very costly and not economical based upon the degree of improvement in the quality of the paper produced from the stock so processed. However, by processing the reject fibrous stock from pressure screen 48, the quality of the paper produced from the accept stock is sufficiently improved to warrant the investment in the equipment and the associated operating costs of this equipment.

One or more auxiliary pumps 76 can be provided as required at different points in the system.

Operation of the apparatus of the present invention now will be described by reference to FIGS. 1 and 2. Pulper 34 is filled with whitewater obtained via pipe 35 from one of the sources of process water being used in the system. Secondary fiber is dumped into the top of pulper 34 and includes all manner of refuse, paper or contaminants. Some of these contaminants are bulk contaminants such as large bottles, cans, large chunks of metal and glass. Some of the contaminants are lighter than water and some are heavier than water. Some of the contaminants comprise sticky substances or waxy substances that will tend to agglomerate and stick to each other and to the processing machinery. Some of these contaminants will dissolve and disperse under the application of heat and pressure, and some will deform their shape so as to be able to pass through openings in some of the screens employed by the process machinery for removing the contaminants.

In the preferred embodiment of the present invention, hot water is provided to the pulper solely by the heated stream of contaminated fibrous stock which leaves outlets 26 of each hydrokinetic amplifier 12. The greatest positive effects are obtained by supplying the hot water to the pulper instead of to other components of the apparatus. This is because in the pulper, the hot water facilitates breakdown of the secondary fiber into fibrous stock. Moreover, the provision of heat to any of the contaminant removal components of the apparatus is undesirable, because the heat causes many of the contaminants to become so pliable that they deform and slip by the screening structures of these contaminant removal components.

The contaminated fibrous stock leaves pulper 34 through the bottom thereof and is received in dump chest 36. An auxiliary pump 76 can be used to pump contaminated fibrous stock from dump chest 36 to the inlet of cyclone separator 46. Substantially all of the heavyweight contaminants are removed from the contaminated fibrous stock by cyclone separator 46 and are collected at the bottom thereof.

The contaminated fibrous stock leaving cyclone separator 46 is directed to the inlet of pressure screen 48. The contaminated fibrous stock is separated into at least two different streams of fibrous stock by pressure screen 48, which removes from one of the separated streams of fibrous stock contaminants larger than a predetermined size. The contaminants are not removed from the system but rather are substantially contained in the other separated stream of fibrous stock, and this other stream is called the reject stock. The accept stock from pressure screen 48 is provided to the papermaking machinery. The accept stock may receive further upgrading by screening or by passage through a refiner before being provided to the papermaking machinery. This accept stock typically would be supplying the primary head box of a fourdrinier machine.

The reject stock is provided to inlet box 56 of vibratory screen 52. The vibratory screen also removes contaminants which are larger than a predetermined size of the screen plate openings, and these contaminants are actually removed from the system as refuse. The accept stream from vibratory screen 52 is fed to a holding tank 66. If needed, an auxiliary pump 76 can be employed to pump the accept stock from vibratory screen 52 to holding tank 76. Process whitewater can be supplied to holding tank 66 from a whitewater storage tank 78.

The contaminated fibrous stock is pumped from holding tank 66 by pump 68 and provided to manifold 70, which feeds contaminated fibrous stock to stock inlet 18 of each hydrokinetic amplifier 12. Steam is provided via steam manifold 82 to each steam inlet 16 of each hydrokinetic amplifier 12. It is noteworthy that the only steam required by the present invention is that which is provided to each hydrokinetic amplifier 12. Moreover, this steam provides the heat which is used to provide hot water to pulper 34 via return pipe 44 from the output of each hydrokinetic amplifier. This steam also increases the pressure of the contaminated fibrous stock sufficiently to pump the contaminated fibrous stock from the outlet of the hydrokinetic amplifier to the pulper. Typically, 50–90 psia steam is adequate to operate hydrokinetic amplifier 12.

Emulsified chemical is supplied from an emulsifying chemical reservoir 84 through a chemical manifold 86 to each chemical feed inlet 20 of each hydrokinetic amplifier 12. During start-up of each hydrokinetic amplifier, the contaminated fibrous stock leaves each hydrokinetic amplifier via overflow discharge 22 until the hydrokinetic amplifier reaches thermal equilibrium. This usually takes anywhere from 30 seconds to 3 minutes. The contaminated fibrous stock exiting each hydrokinetic amplifier 12 via overflow discharge 22 is piped back to holding tank 66 via an overflow discharge pipe 80.

The steam, contaminated fibrous stock, and emulsifying chemicals are mixed in the mixing chambers of hydrokinetic amplifiers. The contaminated fibrous stock condenses the steam, and energy is transferred to the contaminated fibrous stock in the form of heat and pressure. The heat enhances the action of the emulsifying chemicals so that any dispersed contaminants will be suspended and emulsified within the contaminated fibrous stock. The hydrokinetic amplifier has a venturi which compresses the flow of contaminated fibrous stock, increases the pressure of the contaminated fibrous stock, and applies cavitational forces to the contaminants in the contaminated fibrous stock and also to the wet strength flakes which may comprise in part the contaminated fibrous stock. These cavitational forces break up the wet strength flakes and disperse the contaminants.

Once the contaminants are dispersed, the emulsifying chemicals suspend them and prevent them from agglomerating or sticking to any of the process machinery surfaces. The increased pressure of the contaminated fibrous stock is used to pump the contaminated fibrous stock from the outlet of the hydrokinetic amplifier to the pulper. This eliminates the need for any auxiliary pumps in this leg of the process piping of the apparatus. As the heated contaminated fibrous stock is pumped to the pulper, heat is transferred to the pulper contents to facilitate breakdown of the incoming secondary fiber.

The apparatus and method of the present invention uses cavitational forces and heat to break down wax, glue, polymeric films and other contaminants into colloid dimensions which then are stabilized as by emulsifying chemicals. Wet strength fibrous flakes are also broken down by cavitational forces and heat into individual paper pulp fibers.

Any residual emulsifying chemicals entering the pulper are available to act upon any dispersed contaminants that may be produced during any portion of the process performed by the apparatus.

All of the steam is supplied to the hydrokinetic amplifiers, where the steam can be most effectively used to increase the temperature of the stock, produce cavitational forces, increase the pressure of the stock sufficient to pump it back to the pulper, and enhance the chemical action of the emulsifying chemicals.

The contaminant cleaning action of the hydrokinetic amplifier permits use of larger holes in the vibratory screen, and increases the usable pulp yield from the vibratory screen. This also increases the throughput capacity of the vibratory screen, and ultimately the capacity of the apparatus and method of the present invention.

Figure 3:
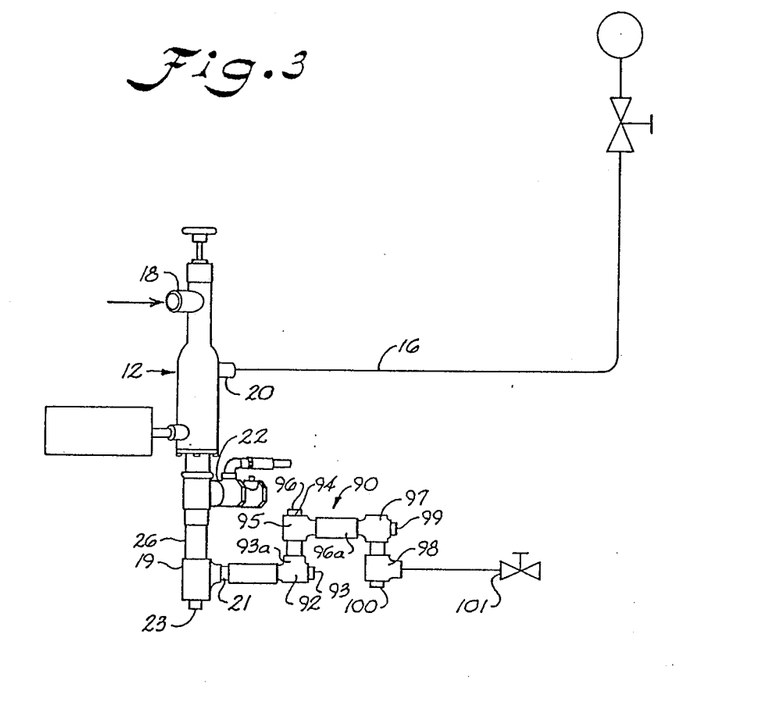
FIG. 3 is a side elevational view partially in schematic illustrating a modified form of the device.

There is illustrated in FIG. 3, a modified form of the invention which includes one of the hydrokinetic amplifiers 12 that is described in more detail in connection with the systems of FIGS. 1 and 2. After the stock leaves the hydrokinetic amplifiers 12 in the system shown in FIG. 1 of the drawing, instead of the stock being fed back to the pulper 34, it can be fed to a further treatment device. One such further treatment of the device is disclosed in FIG. 3. This treatment device is generally identified by the reference character 90 and the purpose of such a device is to cause the fiber exiting from the hydrokinetic amplifier 12 to be forced through a tortuous path so as to aid in further dispersing and breaking up the contaminants provided therein. The fiber stock exiting from the hydrokinetic amplifier 12 first passes through a cross fitting 19 that has a plug 23 provided in the end. The cross fitting 19 has a leader pipe 21 connected to its right angle output. As a result, the stock flowing out of the hydrokinetic amplifier takes an abrupt right angle turn and then passes through the leader pipe 21 to another right angle fitting 92 that has a plug 93 provided therein. The exit port 93a of the right angle fitting is connected to an inlet 94 of still another right angle fitting 95. A plug 96 is provided therein. The outlet of the right angle fitting 95 is connected to a leader pipe 96a that in turn is connected to still another right angle fitting 97. The output of the right angle fitting 97 is in turn connected to still another right angle fitting 98. Each of the right angle fittings 92, 95, 97 and 98 have plugs 93, 96, 99 and 100 provided therein respectively. As the fiber stock passes through the right angle fittings 92, 95, 97 and 98, an abrupt mixing action is imparted to the stock as a result of the stock taking a tortuous path through the treatment device. Such mechanical action applied to the stock further aids in dispersing any contaminants that might be still remaining in the fiber stock. The treatment device 90 utilizes the energy that is remaining in the moving stock exiting from the hydrokinetic amplifier for further breaking up the contaminants. No additional source of power is required for the further treatment device 90. Connected to the output of the joint 98 is a valve 101 which can be used for controlling the back pressure on the hydrokinetic amplifier. As previously mentioned, it is important to control the back pressure on the hydrokinetic amplifier in order to produce the desired cavitation within the hydrokinetic amplifier.

Another advantage of utilizing the treatment device 90 which causes the fiber stock to take a tortuous path as it exits from the hydrokinetic amplifier is to produce a back pressure on the hydrokinetic amplifier which is necessary in order to get good cavitation in the hydrokinetic amplifier.

Figure 4:
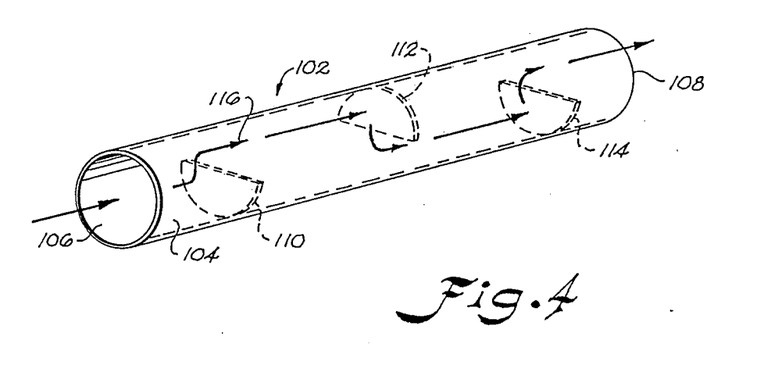
FIG. 4 is an enlarged perspective view of still another modified form of the invention.

Referring now to FIG. 4, there is illustrated a modified treatment device generally designated by the reference character 102. This device 102 includes a cylindrical cylinder 104 which has an inlet end 106 and an exit end 108. Longitudinally spaced within the cylindrical chamber 104 are a plurality of semicircular baffle plates 110, 112 and 114. These baffle plates cause the stock to flow in a tortuous path as it passes through the cylinder 104. The path that the stock takes is generally along the line represented by the arrows 116. As can be seen, the stock first enters the inlet and strikes baffle plate 110. It takes an abrupt change in direction and moves to the next baffle 112 where it strikes the baffle 112. At this point, a second change in direction takes place. Additional baffles can be used for aiding in dispersing and emulsifying any contaminants associated with the fiber stock.

Figure 5:
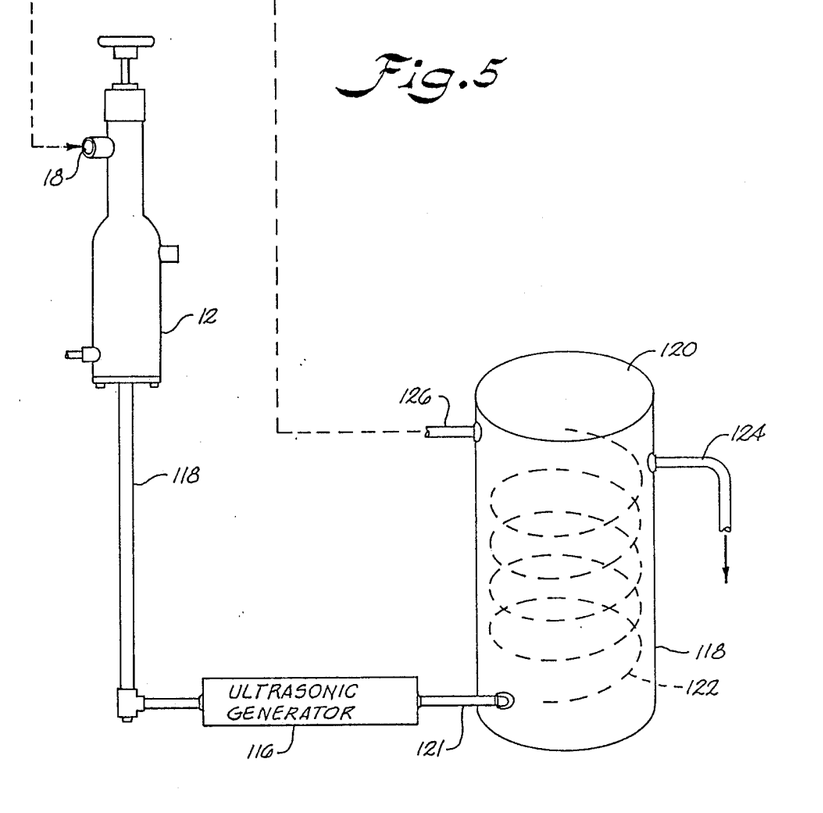
FIG. 5 is an elevational view partially in schematic, illustrating a modified form of the invention for treating stock after exiting from a hydrokinetic amplifier.

In FIG. 5, there is illustrated still another modified form of the invention which utilizes the energy possessed in the stock as it exits from the hydrokinetic amplifier. The hydrokinetic amplifier 12 has its outlet connected by means of a pipe 118 to the inlet of a treatment device such as an ultrasonic generator 116. Any suitable ultrasonic generator 116 of the liquid whistle type can be utilized for generating high intensity ultrasonic waves responsive to a thin stream of the slurry impinging upon a flexible metal blade carried within the ultrasonic generator. The vibration of the blade causes ultrasonic waves to be produced which further breaks down any contaminants contained within the fibrous stock. No additional force is required since the stock exiting from the ultrasonic generator is under pressure.

Ultrasonic generators of the liquid whistle type have been proposed for use in deinking of waste paper and one such proposal is disclosed in an article entitled "Ultrasonic Deinking Of Waste Paper" by Leslie L. Turai and Chung Haw Teng published in Tappi, February, 1978.

The outlet of the treatment device 116 is connected to the inlet of a floatation deinking cell 118. The floatation deinking cell includes a cylindrical tank 120 which has an inlet 121 adjacent one side of the tank which causes the stock to pass in the form of a liquid medium in a spiral path as indicated by the arrows 122 from the bottom of the tank towards the top of the tank. The majority of the stock is removed from the tank at the outlet 124. A certain percentage of contaminants are raised to the top of the floatation cell and exit through pipe 126 which can be returned to the inlet of the hydrokinetic amplifier for subsequent treatment.

The floatation deinking cell 108 has baffles (not shown) therein and as the mixture of stock entering the bottom of the tank engages these baffles, bubbles form in the mixture. The bubbles will rise rapidly to the top of the tank, and as they rise, they will collect contaminants forming a floatable rich layer that is taken off at the recirculating outlet 126. The pressure at the inlet to the floatation cell would be approximately 20 psi and the stock at this point in time is from 2 to 4 percent solids. The floatation cell could be any suitable conventional floatation deinking cell.

It will be apparent to those skilled in the art that various modifications and variations can be made in the apparatus and method for improving the quality of paper manufactured from secondary fiber without departing from the scope or spirit of the invention. Thus, it is intended that the present invention cover the modifications and variations of this invention provided they come within the scope of the appended claims and their equivalents.

What is claimed is:

1. An apparatus for improving the quality of paper manufactured from a contaminated fibrous stock including secondary fiber, contaminants smaller than a predetermined size, and contaminants with a specific gravity approximately that of the specific gravity of whitewater used in the production of recycled paper stock, the apparatus comprising:

a source of steam;
a source of contaminated fibrous stock;
a hydrokinetic amplifier means having a mixing chamber connected to each of steam inlet, a stock inlet and a venturi, said amplifier means having an outlet connected to said venturi, said mixing chamber having an interior wall, said steam inlet connected to said source of steam for allowing steam to enter said mixing chamber, said stock inlet connected to said source of contaminated fibrous stock for receiving said contaminated fibrous stock and structured for supplying same to said mixing chamber in the form of a vertical liquid column which is substantially out of contact with said interior wall, said amplifier means for mixing in said mixing chamber said contaminated fibrous stock with steam entering through said steam inlet and thereby condensing said steam to transfer the energy of said steam to said contaminated fibrous stock to increase the temperature of said contaminated fibrous stock from said stock inlet to said outlet, said amplifier means for subjecting said contaminants in said contaminated fibrous stock to increased pressure in said venturi to produce dispersed contaminants in said contaminated fibrous stock, said outlet for supplying contaminated fibrous stock having dispersed contaminants therein and at a pressure and temperature substantially greater than the pressure and temperature of said contaminated fibrous stock received by said stock inlet, a treatment device coupled to said outlet of said hydrokinetic amplifier for further emulsifying and dispersing contaminants contained in said fibrous stock exiting from said outlet of said hydrokinetic amplifier, said treatment device including means for mechanically manipulating said fibrous stock as it passes through said treatment device.

2. The apparatus as set forth in claim 1 further comprising:
said treatment device including means for abruptly changing the direction of flow of said fibrous material as it passes through said treatment device.

3. The apparatus as set forth in claim 1 further comprising:
said treatment device including a chamber having an inlet and outlet; and
baffles carried in said chamber for causing said fibrous stock passing through said chamber to travel in a tortuous path.

4. The apparatus as set forth in claim 1 further comprising said treatment device including an ultrasonic generator of the liquid whistle type.

5. The apparatus as set forth in claim 2 further comprising:
a floatation cell connected to said treatment device for receiving fibrous material from said treatment device; and
means provided in said floatation cell for causing contaminants contained in said fibrous material to be floated to the top of said cell for removal.

6. An apparatus for producing fibrous stock from recycled paper products, comprising:
means for receiving ,said recycled paper products and converting said recycled paper products into a slurry containing fibrous, stock and contaminants;
means for separating said slurry into an accept fibrous stock suitable for use in making paper products and a reject fibrous stock containing contaminants;
a treatment means for converting said reject fibrous stock containing said contaminants into a mixture of fibrous stock with dispersed contaminants of a reduced size;
said treatment means including,
(i) a housing having an interior wall, an outlet, and an inlet for receiving said reject fibrous stock and contaminants.
(ii) means for feeding said reject fibrous stock and contaminants through said housing in the form of a vertical liquid column which is substantially out of contact with said interior wall, and
(iii) means for supplying steam to the interior of said housing structured so that the steam engages said vertical column of reject stock flowing through said housing to heat said stock and raise the pressure of said stock from the temperature and pressure of the stock entering said treatment means, and
(iv) a treatment device coupled to the output of said treatment means for further emulsifying and dispersing contaminants contained in said fibrous stock exiting from said output of said treatment means, said treatment device including means for mechanically manipulating said fibrous stock as it passes through said treatment device.

* * * * *